(12) United States Patent
Mayers et al.

(10) Patent No.: US 7,783,983 B1
(45) Date of Patent: Aug. 24, 2010

(54) USER INTERFACE FOR CONTROLS

(75) Inventors: Clay Mayers, San Diego, CA (US); Gregory M. Cusanza, Redmond, WA (US); Nathan Anthony Courey, San Diego, CA (US)

(73) Assignee: EMC Corporation, Hopkinton, MA (US)

( * ) Notice: Subject to any disclaimer, the term of this patent is extended or adjusted under 35 U.S.C. 154(b) by 479 days.

(21) Appl. No.: 11/279,706

(22) Filed: Apr. 13, 2006

(51) Int. Cl.
*G06F 3/00* (2006.01)
*G06F 9/00* (2006.01)
*G06F 17/00* (2006.01)

(52) U.S. Cl. .................. 715/764; 715/768; 715/790; 715/788

(58) Field of Classification Search ............... 715/764, 715/788, 790, 768
See application file for complete search history.

(56) References Cited

U.S. PATENT DOCUMENTS 7,058,891 B2 * 6/2006 O'Neal et al. .............. 715/730
2005/0166158 A1 * 7/2005 Blanchard et al. .......... 715/768

\* cited by examiner

*Primary Examiner*—Kieu Vu
*Assistant Examiner*—Sabrina L. Greene
(74) *Attorney, Agent, or Firm*—Workman Nydegger (57) ABSTRACT

A method and system for displaying a graphical user interface on the display device. Methods include displaying a control area on a graphical user interface, the control area including at least one control field associated with an attribute of a content source, the control field being configured to be viewable via the control area and displaying a content area on the graphical user interface such that the control area and the content area are at least partially superimposed and simultaneously visible on the graphical user interface, the content area displaying content of at least a portion of the content source.

20 Claims, 5 Drawing Sheets

USER INTERFACE FOR CONTROLS

BACKGROUND

1. The Field of the Invention

The present invention relates generally to systems and methods for configuring graphical user interfaces. More specifically, the present invention relates to unique methods and systems for displaying control areas and content areas of a graphical user interface.

2. The Relevant Technology

Computers and computing systems have affected nearly every aspect of modern living. Computers are generally involved in work, recreation, healthcare, transportation, entertainment, household management, etc. While many industries have been enhanced and made more profitable by being able to automate and implement digital technology, certain tasks still rely on human decisions. For example, humans cannot rely on automated systems to comprehend the content of every piece of documentation that the system may encounter. Humans are still required to make certain judgment as to the content, order, placement, and ultimate outcome of how a document is used.

For instance, in the document capture industry, computers are used to scan thousands of pages into a computer's memory. However, a human is often required to visually review the content of the document to ensure that a computer did not err in scanning content or in placing certain pages of documentation together. Further, a human must usually make the ultimate decision as to where the document will ultimately be located for future reference. It would thus be advantageous to provide graphical user interfaces which make the document review process more efficient.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention provide for methods, systems, and computer readable media for displaying a graphical user interface on a display device of a computer system such that a user can view control fields relating to a content source as well as view the content of the content source in an efficient manner. The graphical user interface includes a control area that allows a user to control the attributes of the content source. While a user is viewing control fields to control and/or navigate the content source, the graphical user interface includes a content area for displaying the content of a selected content source as superimposed with one or more control fields while still being able to view the one or more control fields through the content area. That is, the control area and the content area are configured to be at least partially overlapped or superimposed such that the content area and the control area are simultaneously viewable.

By superimposing the control area and the content area in an overlapping manner, a user can easily visualize content sources, such as documents or files, as well as easily view and/or manipulate aspects of the content source using the control fields while minimizing eye movement. Optionally, a user may have the ability to temporarily convert at least a portion of the content area to be more opaque such that the user can more easily view the content of the content source. Optionally, a user may further be able to make changes to the content source. After viewing and changing a content source, the content area reverts back to a more transparent view such that the control area superimposed with the content area are simultaneously viewable.

Further, such a configuration also allows at least the control area to be larger than is normally allowed in conventional control navigation configurations. Conventionally, the control area is located on the top, bottom or sides of a content area. Viewing areas for controls typically display the controls in smaller fonts and fields. For example, a file storage is typically illustrated in a tree-type structure in a smaller font that is difficult to view. The present invention allows the control area to be larger to facilitate viewing of items in a control area. In some cases, a tree-type structure is not always an optimal way to view file contents and so some control navigation configurations allow a user to view a thumbnail image of a content source. In these conventional systems where a user selects a thumbnail view, the control area expands and makes the content area smaller. The present invention thus allows the control area to be larger without sacrificing the size of the content area in which to view the content source.

Having control fields superimposed with content would normally be considered to be unfavored in the conventional graphical user interface art due to reduced visibility of the content. However, the present invention actually increases the productivity of a user who needs to quickly view both control fields and the content sources to which the control fields relate. In certain occupations, rapid viewing and control of a large number of documents or files can be important to productivity and, as such, can greatly benefit from the present invention. Such occupations may include, but are not limited to, document capture, postal work, or general word processing/editing, and the like.

Figure 1A:
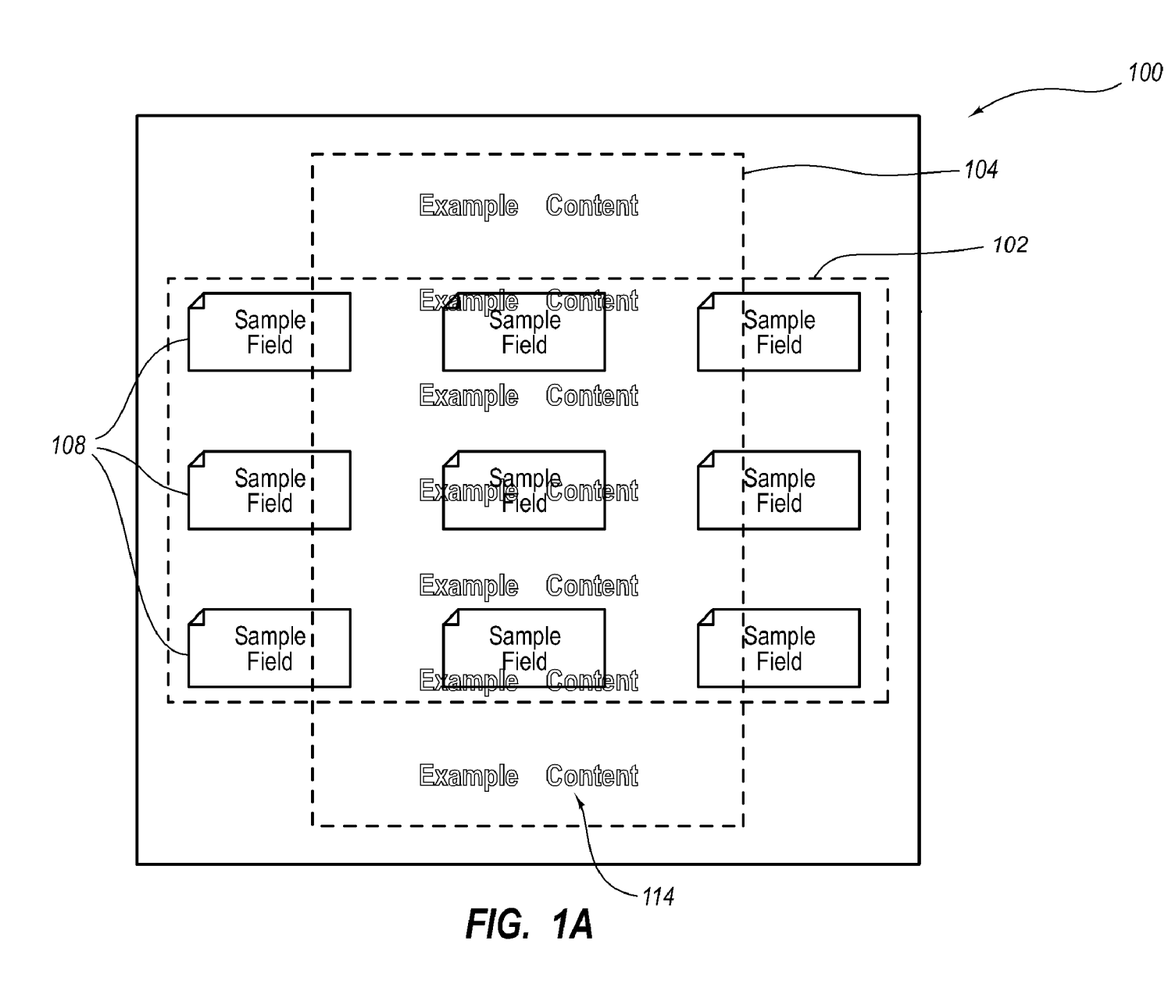
FIG. 1A illustrates a graphical user interface including a generic content area superimposed with a generic control area.

Referring now to FIG. 1A, aspects of the present invention are described in further detail. FIG. 1A illustrates a graphical user interface or display area 100 configured to be displayed on a viewing area of a display device, such as a computer monitor, of a computer system (not shown). The graphical user interface 100 may take up only a portion of the viewing area of the display of the computer system, or may occupy the entire display.

The graphical user interface 100 includes a control area, designated by dashed line 102. The control area 102 includes one or more control fields 108, each labeled "sample field." As used herein, the term "control field" refers generally to an area that is viewable and/or selectable by the user to display or modify an attribute of one or more content source. The control field may display or modify an attribute that is applicable to more than one content source. Alternatively, the control field may display or modify an attribute that is specific to a particular content source. For example, the control fields 108 may be a thumbnail image of the content source that allows a user to control the storage location and/or storage order of the related content source, or may be configured to allow the user to select which thumbnail image should be expanded to a larger display. Other examples of the functions that the control fields 108 may be configured to perform will be described in more detail below.

The graphical user interface 100 also includes a content area, designated by the dashed line 104. The content area 104 displays the content of a content source 114 to a user. In the example of FIG. 1A, the content of the content source 114 consists of a text document, i.e., the repeated display of "Example Content." However, the content source 114 displayed in the content area 104 may include all types of content, including images, video, text, hyperlinks, and all other visual content capable of being displayed on the display of a computer system.

The content area 104 and the control area 102 are both viewable on the same graphical user interface 100. The control area 102 and the content area 104 are positioned such that at least a portion of the control area 102 overlaps at least a portion of the content area 104. Therefore, both the control area 102 and the content area 104 are simultaneously viewable within the graphical user interface 100 of the display device. The order in which information is displayed in the control area 102 and content area 104 is not important. In operation, the user may view control fields in the graphical user interface 100 before any content is displayed in the content area 104. Alternatively, a user may be viewing content in the content area 104 and then convert the graphical user interface 100 to be able to simultaneously view control fields in control area 102 at least partially superimposed with the content area 104.

In one embodiment, the selected content source 114 being displayed in the content area 104 is associated with one or more of the control fields 108 in the control area 102. Therefore, the attributes of the content source 114 being displayed in the content area 104 can be controlled by selecting the appropriate control field 108. For example, the control fields 108 may be used to select a particular content source to view and so a content source 114 displayed in the content area 104 may be the content source related to the most recently selected control field 108. Further, even though content of the content source 114 is viewable through content area 104, the content fields 108 superimposed with the content source 114 are active. For example, a user may desire to view a different content source, and may be required to select a different control field 108 that is superimposed with the current content source 114. Upon selecting the different control field 108, the content area 104 changes to display the new content source while maintain a display of the control fields 108 superimposed with the new content source. The present invention thus allows a user to easily manipulate control area 102 and, in one example, view the content of the content sources which the user is manipulating, thus minimizing the user's eye movement and making such viewing and/or manipulation more efficient.

Figure 1B:
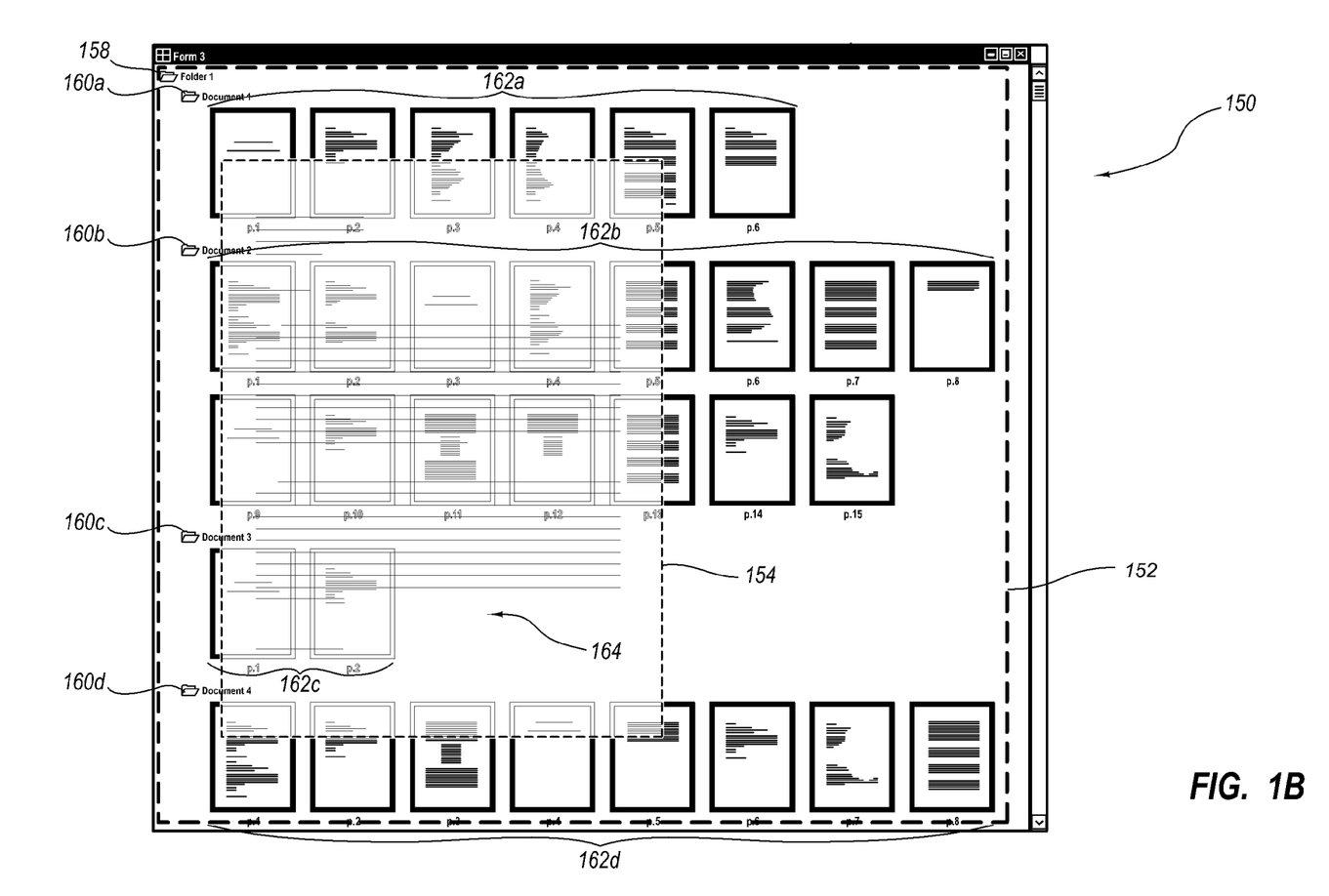
FIG. 1B illustrates a graphical user interface including a content area superimposed with a control area including folder fields, document fields and page fields, the control area being displayed in a more prominent style than the content area.

FIG. 1B provides another example of a graphical user interface 150 including a control area 152 superimposed with at least a portion of a content area 154. Similar to the FIG. 1A example, the content area 154 includes the content of a content source 164. The control fields included within the control area 152 include a folder field 158, document fields 160a-d, and a plurality of page fields 162a-d. Each document field 160 controls the attributes of one or more documents associated with the document field 160. For example, a document may include one or more pages. In this example, both the document and the pages belonging to the document could be considered to be content sources. When a user selects one of the document fields 160, thumbnail images of pages belonging to a document (which constitute page fields 162) are displayed in the content area 154. Thus, each page field 162 controls the attributes of a page associated with the page field. For example, when a user selects one of the page fields 162, the content of the page related to the selected page field 162 may be displayed in the content area 154.

The control area 152 may hierarchically organize and display the document fields 160 and the page fields 162 such that a user can visually comprehend the relationship between the corresponding documents and pages. For example, in FIG. 1B, the page fields 162a contained within the document field 160a are indented and placed directly below the document field 160a. A similar relationship exists between the document field 160b and page fields 162b, the document field 160c and page fields 162c, and the document field 160d and page fields 162d.

In one embodiment, the control area 102 is further configured to provide the user with the ability to reorganize the relationship between the document fields 160 and the page fields 162. For example, the control area 102 may provide the user the ability to move the page fields 162 to alternative documents by dragging and dropping the page fields 162 to a desired document field 160. The control area 102 can be configured to automatically refresh to reflect the newly organized documents and pages.

The user may also be provided with the ability to insert and/or delete documents and/or pages. For example, a user may determine that the pages within the page field group 162b should be divided into two separate documents: a first document containing pages 1 through 8 (labeled p.1-p.8) and a second document containing pages 9 through 15 (labeled p. 9-p. 15). Therefore, the user may create a new document between pages 8 and 9. The new document may be created, for example, by selecting a "new document" button or field, or by completing a designated key stroke. Upon the creation of the new document, the pages 9 through 15 will automatically be placed within the new document created by the user, and the control area can automatically refresh to reflect the newly organized documents and pages.

As mentioned above, the control area 152 may also include one or more folder fields 158. Each folder field 158 may include one or more documents, and the folder fields 158 and the document fields 160 are hierarchically displayed to illustrate the relationship between the document fields 160 and the folder fields 158. Each folder field 158 controls the storage location attributes of the documents contained within the folder. Where multiple folder fields 158 exist, a user may be provided with the ability to move document fields 160 between the multiple folders 158.

Because the content area 154 and the control area 152 are at least partially superimposed within the same graphical user interface 150, in order to assist a user to distinguish between the control area 152 and the content area 154, in one embodiment of the invention the control area 152 and the content area 154 may be displayed in distinct display styles. For example, the content area 154 and the control area 152 shown in FIG. 1B are displayed in a manner which gives the control fields, i.e., folder field 158, document fields 160a-d, and a plurality of page fields 162a-d, in control area 152 greater prominence or visibility than document 164 in content area 154, even though a user can still obtain a general indication of the content of content area 154.

Figure 1C:
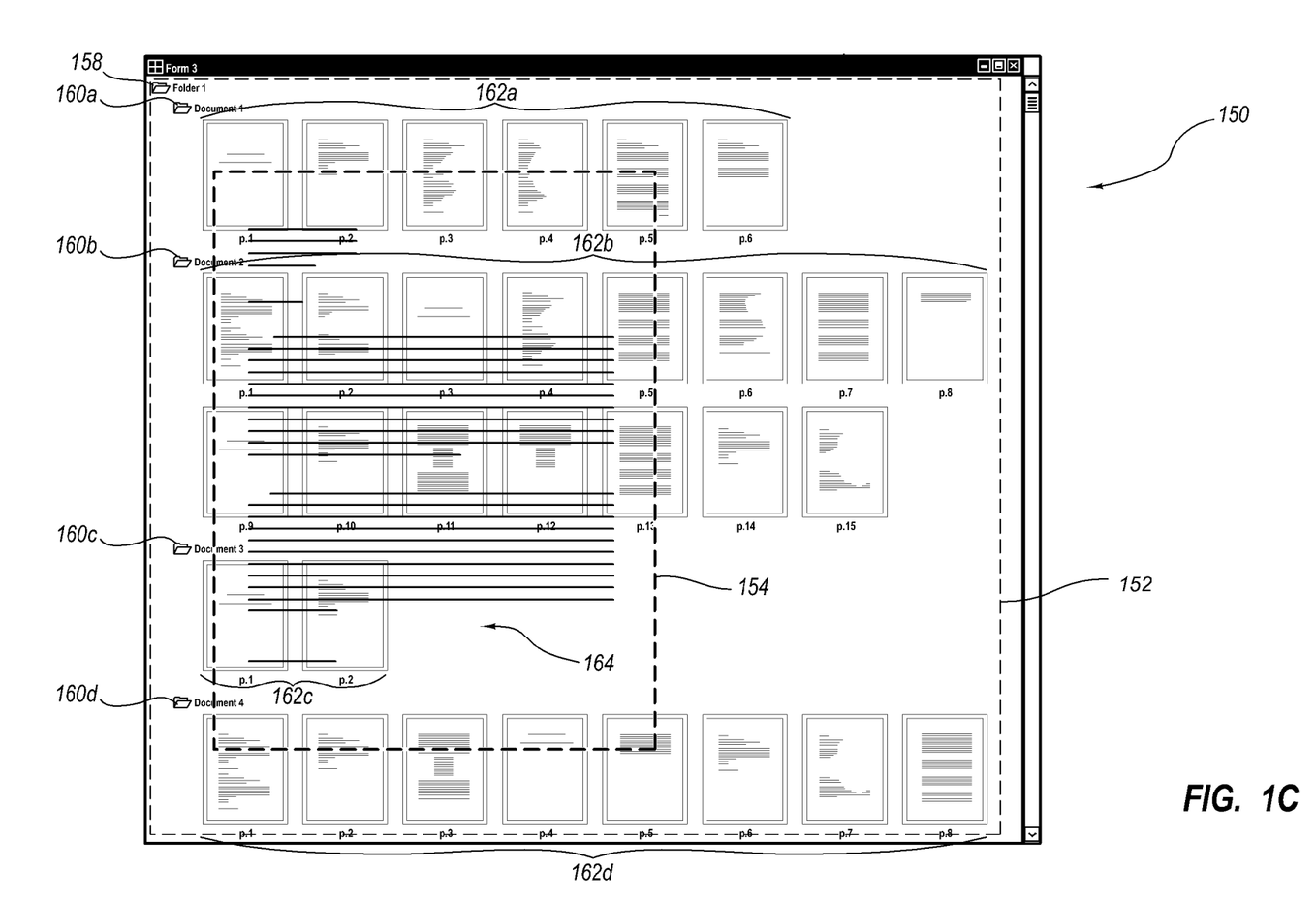
FIG. 1C illustrates a graphical user interface including a content area superimposed with a control area, the content area being displayed in a more prominent style than the control area.

In comparison, the embodiment illustrated in FIG. 1C displays the content in content area 154 in a more prominent style than the control fields 158, 160 and 162 of the control area 152. By displaying the control fields 158, 160 and 162 in less prominent style than that used to display the content area 154, a user can more easily focus on the content of the content source 164 displayed in the content area 154. Advantageously, the user can also easily switch his or her focus to the control fields 158, 160 and 162 when necessary because the control area 152 is displayed superimposed with, albeit in a less prominent style, in comparison to the content area 154.

While both the control area 152 and content area 154 are at least partially superimposed with each other, the embodiment of FIG. 1B having the control area 152 more prominently displayed than the content area 154 may be viewed as having the control area 152 layered on top of the content area 154, at least from the viewpoint of the user. Similarly, FIG. 1C may be viewed as having the content area 154 layered on top of the control area 152, at least from the viewpoint of the user. In one embodiment, a user can alternate between the prominence of the control area 152 and content area 154 depending on the task the user desires to accomplish. For example, an icon, button or keystroke may be employed by the user to alternate the prominence of the control area 152 and the content area 154.

Although the examples described above include the use of more or less prominent styles for distinguishing between the control area 152 and the content area 154, other methods of creating distinct display styles can also be implemented to assist in differentiating between control area 152 and content area 154. For example, the content of the content source 164 may be displayed in a first color, while the control area 152 is displayed in a second color. Alternatively, different shading, font styles and/or sizes may be employed to assist in distinguishing between the control area 152 and the content area 154. The shape of the control area 152 may be different than the shape of the content area 154. Many techniques may be employed to achieve the goal of providing a visual distinction between the control area 152 and the content area 154 while still displaying the control area 152 at least partially superimposed and visible with the content area 154 and vice versa.

Figure 1D:
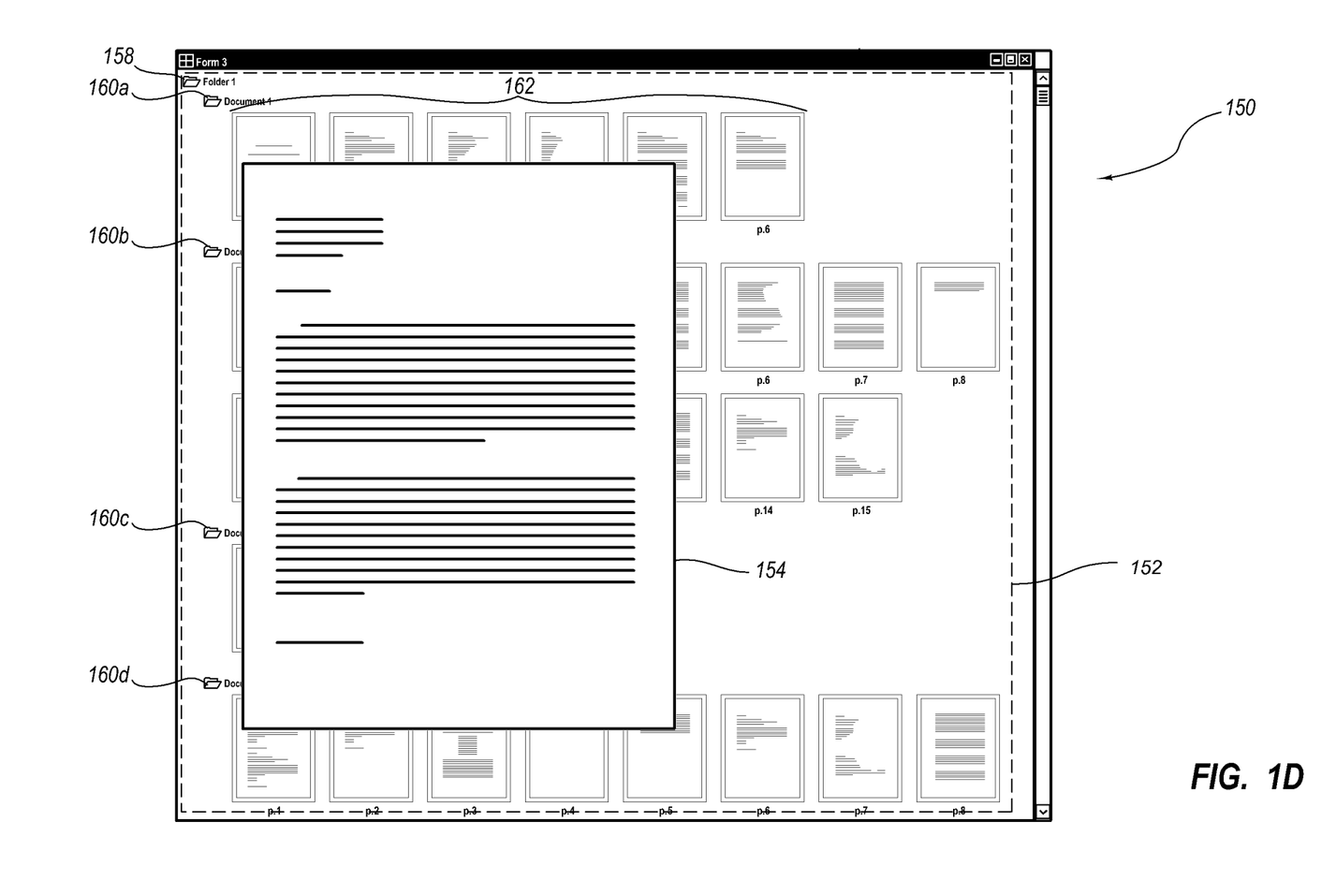
FIG. 1D illustrates a graphical user interface including a content area superimposed with a control area, the content area being displayed in a more opaque style than the control area.

In one embodiment, the content area 154 may be selectively editable by the user to allow the user to revise the content source 164 being displayed. For example, in a default mode, the content of the content source 164 may be displayed in a read-only format so that the user can freely interact with the control fields in control area 152 without inadvertently altering the content of the content area 154. However, the user can also activate an editing mode, wherein the content is displayed in such a manner that allows the user to edit the content of the content source 164. When the user has completed any necessary editing of the content source 164, the user can revert to the default display mode in order to continue interacting with the control area 152. In one embodiment, as illustrated in FIG. 1D, the editing mode enhances the prominence of the content area 154 so that the content area is more opaque than in the read-only format. This may allow a user to better view the content of the content area 154 in the editing mode. A user may activate an editing mode using, for example, an icon, button or keystroke.

Systems for implementing graphical user interfaces are well known in the art, and, as such, will not be described in significant detail. The present invention can be implemented in any computer system that utilizes a display. Such computer systems can be general-purpose or special purposes computers. The present invention can be implemented by including a software module in the programming of the graphical user interface to generate the features of the present invention.

Figure 2:
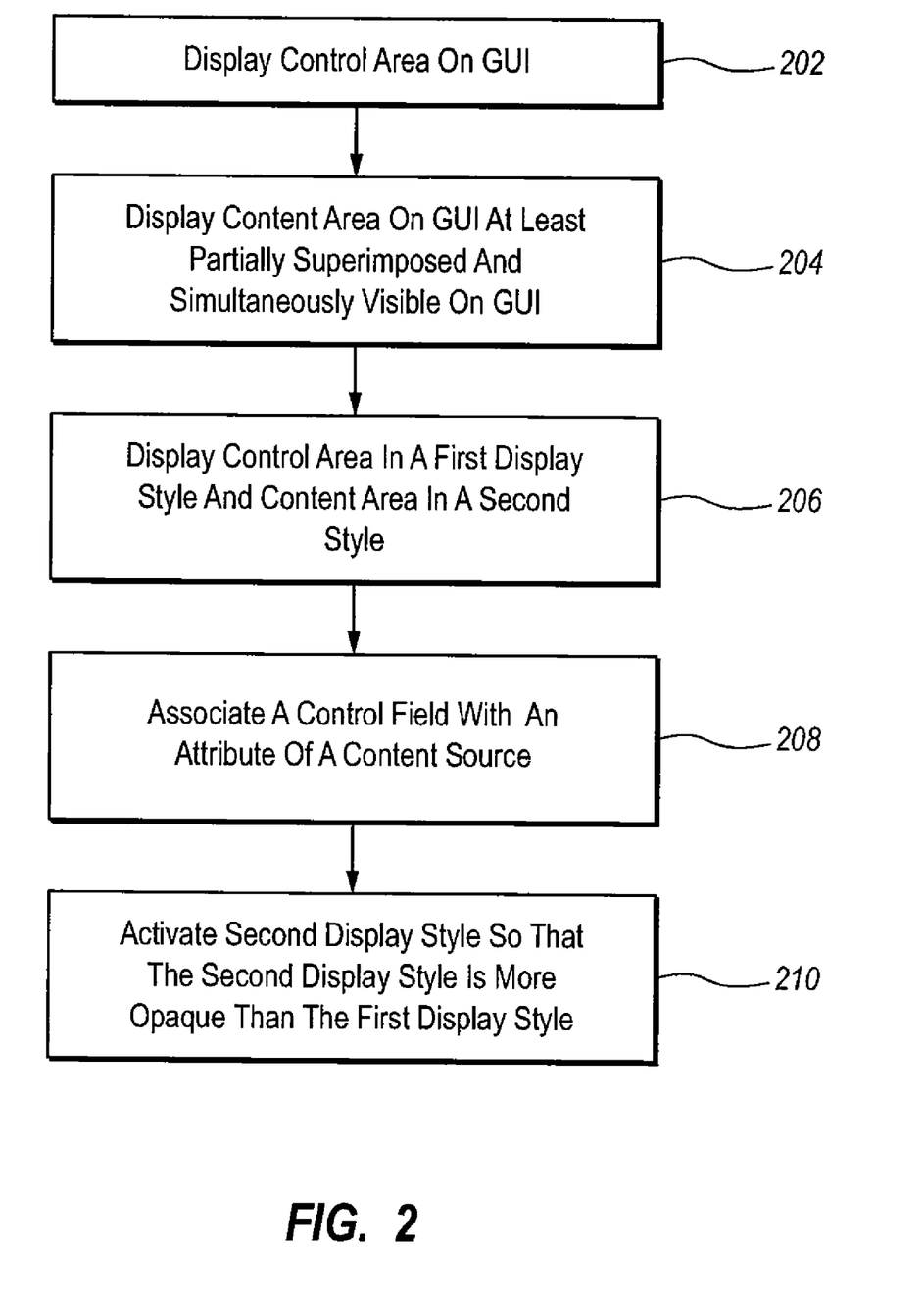
FIG. 2 illustrates an exemplary method for displaying a graphical user interface on a display device of a computer system.

Referring now to FIG. 2, a method 200 of displaying a graphical user interface on a display device of a computer system is illustrated. The method 200 includes, at 202, displaying a control area on a graphical user interface, the control area including at least one control field for controlling an attribute of a content source. At 204, the method 200 further includes displaying a content area on the graphical user interface such that the control area and the content area are at least partially superimposed and simultaneously visible on the graphical user interface, the content area displaying content of at least a portion of a selected content source. In one embodiment, at least one of the control area or content area is displayed such that the at least partially superimposed portion is semi-transparent.

At 206, the method 200 may also include displaying the control area in a first display style and the content area in a second display style that is distinct from the first display style for assisting a user in differentiating between the content area and the control area. One of the first or second display styles can be more prominently styled than the other of the first or second display styles. A user may also alternate between the prominence of the first and second display style.

At 208, the method 200 may further include identifying at least one content source and associating the at least one content source with a control field. In one embodiment, the control field is selectable via the control area to be able to control an attribute of the at least one content source. Controlling an attribute of a content source may include allowing a user to select the control field, which selection initiates displaying the content of the content source in either the content area or the control area. It may further include using the control field to specify the storage location of a particular content source.

Associating the content source with a control field can be used for organizing a plurality of content sources, such as pages in a document using the graphical user interface. Automated document imaging and scanning is becoming increasingly important to many businesses, including, but not limited to, financial institutions, the medical and health care field, real estate, and the legal industry. Where the content source may be a page and the control field is used to control the organization of the page in reference to other pages, a user may select a control field and display the page content in the content area.

The user may associate the page with a document having one or more pages by using the control field associated with the page to position the page within the document. The user may place the page in a proper order in reference to other pages. For example, the page may be one in a series of pages that should be kept in a paginated order. The document may further be associated with a control field that controls the location of storage of the document.

At 210, the method 200 may include allowing a user to activate the second display style of the content area such that the second display style is more opaque than the first display style. This may be useful, for example, to allow a user to more efficiently edit the content of the content source. When the user has completed editing the content source, the second display style of the content area may be activated to revert back to the original second display style so that the user can continue to view and manage the control fields in the content area.

Embodiments of the invention also include the control fields displaying attributes of a particular content source. For example, the content area could be displaying a page and the control area may display in various control fields various header fields for different areas of the page. The header fields can display different regions of the page and also allow a user to select a header field to go to a particular section of the page. Control fields can also be configured to contain other text from the content source and allow a user to edit the text in the control field. Other configurations and uses for control fields will be apparent to those of skill in the art upon understanding the teachings of the present invention.

The systems, methods, and user interfaces described herein may be applied to a variety of computer applications. By way of example, and not limitation, the concept of superimposing a content area and a control area on the same graphical user interface can be useful in document capture applications. For instance, oftentimes, after scanning thousands of pages into a computer's memory, a user is it left to manually sort each of the scanned pages into their appropriate documents. Using the techniques described herein, a graphical depiction is presented to the user which illustrates the relationship between the page being viewed in the content area and the control fields displayed in the control area. Advantageously, the user is able to organize and sort the pages and documents while minimizing eye movement between the pages being viewed in the content area and the control fields used to organize the pages and documents. Other examples of applications that may benefit from the techniques described herein include, but are not limited to, digital image organizers and viewers, PDF viewers and editors, digital audiovisual organizers and viewers, and the like.

Embodiments herein may comprise a special purpose or general-purpose computer including various types of computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system having a display device, a method for displaying a graphical user interface on the display device to allow a user to view content of a content source and control fields relating to the content source, the method comprising:

displaying a control area on a graphical user interface, the control area including at least one control field associated with an attribute of a content source, the control field being configured to be viewable via the control area;

displaying a content area on the graphical user interface, the content area displaying content of at least a portion of the content source;

superimposing the content area with the control area in a superimposed portion of the graphical user interface, the control area and the content area being displayed such that at least a portion of the control area and at least a portion of the content area are superimposed and such that the portion of the control area and the portion of the content area that are superimposed are both simultaneously visible on the graphical user interface in the superimposed portion;

selecting the at least one control field, wherein the at least one control field is configured to display or modify the attribute of the content source;

displaying content of the content source associated with the selected at least one control field;

controlling the attribute of the content source while the content and the content area continues to be superimposed with the control area and while both the control area and the content area are simultaneously visible on the graphical user interface at least in the superimposed portion such that the content area is visible through the control area converting the content area in at least the superimposed portion to be more opaque when changing the content source; and reverting the content area in at least the superimposed portion to be less opaque after changing the content source.

2. The method as recited in claim 1, wherein at least one of the portion of the control area or the portion of the content area is displayed as semi-transparent.

3. The method as recited in claim 1, further comprising displaying the control area in a first display style and the content area in a second display style that is distinct from the first display style for assisting a user in differentiating between the content area and the control area.

4. The method as recited in claim 3, wherein one of the first or second display styles can be more prominently styled than the other of the first or second display styles.

5. The method as recited in claim 4, wherein a user can alternate between the prominence of the first and second display style.

6. The method as recited in claim 3, wherein the first display style being distinct from the second display style is accomplished by at least one of:
   configuring the first display style and second display style in different colors;
   configuring the first display style and second display style in different shading;
   configuring the first display style and second display style in different shapes;
   configuring the first display style and second display style in different font styles; or
   configuring the first display style and second display style in different font sizes.

7. The method as recited in claim 3, further comprising activating the second display style so that the second display style is more opaque than the first display style.

8. The method as recited in claim 1, wherein selecting the at least one control field initiates at least one of:
   displaying a content of the content source in the content area;
   displaying a content of the content source in the control area; or
   organizing the content source in a storage location.

9. In a computer system, a method for displaying one or more pages in a document on a graphical user interface, the method comprising:
   displaying a control area on a graphical user interface, the control area including displaying control fields, the control fields being configured to be viewable via the control area;
   displaying a content area on the graphical user interface, the control area and the content area being displayed such that at least a portion of the control area and at least a portion of the content area are superimposed and such that the portion of the control area and the portion of the content area that are superimposed in a superimposed portion of the graphical user interface are both simultaneously visible on the graphical user interface in the superimposed portion;
   identifying one or more pages of content in the content area;
   associating an attribute of each of the one or more pages with at least one control field included in the control fields;
   selecting a particular control field, the particular control field configured to display or modify an attribute of the one or more pages;
   controlling the attribute of the one or more pages with the particular control field while the one or more pages are superimposed with the control area and while the one or more pages are simultaneously visible on the graphical user interface; and
   converting the content area in at least the superimposed portion to be more opaque when changing the content source; and
   reverting the content area in at least the superimposed portion to be less opaque after changing the content source.

10. The method as recited in claim 9, further comprising:
    receiving a selection of at least one control field from a user; and
    displaying at least a portion of content of at least one page associated with the selected control field in the content area.

11. The method as recited in claim 10, further comprising displaying the at least one page in the content area as more opaque than the control area.

12. The method as recited in claim 9, further comprising:
    identifying at least one document; and
    using at least one control field to associate at least one page with the at least one document.

13. A graphical user interface displayed on a display device of a computer system to allow attributes of content to be controlled through the user interface, the graphical user interface comprising:
    a control area configured to display at least one control field associated with an attribute of a content source, the at least one control field being configured to be viewable via the control area, wherein the at least one control field is configured to modify or display the attribute of the content source; and
    a content area configured to display content of the content source, the control area and the content area configured to be displayed such that at least a portion of the control area and at least a portion of the content area are superimposed and such that the portion of the control area and the portion of the content area that are superimposed are both simultaneously visible on the graphical user interface;
    wherein a selection of the at least one control field enables control and manipulation of the attribute while both the control area and content area are superimposed in a superimposed portion and simultaneously visible on the graphical user interface in the superimposed portion;
    wherein the content area in at least the superimposed portion is converted to be more opaque when changing the content source and wherein the content area in at least the superimposed portion is reverted to be less opaque after changing the content source.

14. The graphical user interface as recited in claim 13, further comprising at least a portion of the control area and at least a portion of the content area being configured to be displayed as semi-transparent.

15. The graphical user interface as recited in claim 14, further comprising the at least one control field being configured such that selection of the at least one control field initiates at least one of:
    displaying a content of the content source in the content area;
    displaying a content of the content source in the control area; or
    organizing the content source in a storage location.

16. The graphical user interface as recited in claim 13, further comprising the control area configured to be displayed in a first display style and the content area configured to be displayed in a second display style that is distinct from the first display style for assisting a user in differentiating between the content area and the control area.

17. The graphical user interface as recited in claim 16, further comprising one of the first or second display styles being configured to be displayed more prominently than the other of the first or second display styles.

18. The graphical user interface as recited in claim 17, further comprising the first and second display styles being configured such that a user can alternate between the prominence of the first and second display style.

19. The graphical user interface as recited in claim 16, further comprising the first display style and second display style being distinct such that the first display style and second display style are at least one of:
configured in different colors;
configured in different shades;
configured in different shapes;
configured in different font styles; or
configured in different font sizes.

20. The graphical user interface as recited in claim 13, further comprising the second display style being configured such that the second display style is more opaque than the first display style.

* * * * *